(12) United States Patent
Degenhardt et al.

(10) Patent No.: US 7,969,901 B2
(45) Date of Patent: Jun. 28, 2011

(54) METHOD AND DEVICE FOR COMPENSATING FOR RUNTIME FLUCTUATIONS OF DATA PACKETS

(75) Inventors: Achim Degenhardt, Germering (DE); Daniel Goryn, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 911 days.

(21) Appl. No.: 11/203,401

(22) Filed: Aug. 12, 2005

(65) Prior Publication Data

US 2006/0039412 A1 Feb. 23, 2006

(30) Foreign Application Priority Data

Aug. 12, 2004 (DE) .................... 10 2004 039 185
Aug. 12, 2004 (DE) .................... 10 2004 039 186

(51) Int. Cl.
 *H04L 12/26* (2006.01)
 *H04J 3/06* (2006.01)
(52) U.S. Cl. ........................ 370/252; 370/519
(58) Field of Classification Search ........... 370/229–235
 See application file for complete search history.

(56) References Cited

U.S. PATENT DOCUMENTS

| | | | |
|---|---|---|---|
| 5,640,388 A | 6/1997 | Woodhead et al. | |
| 5,768,527 A * | 6/1998 | Zhu et al. | 709/231 |
| 6,259,677 B1 | 7/2001 | Jain | |
| 6,301,258 B1 | 10/2001 | Katseff et al. | |
| 2002/0009054 A1 * | 1/2002 | Suzuki et al. | 370/252 |
| 2002/0027879 A1 * | 3/2002 | Kuriki et al. | 370/229 |
| 2003/0152094 A1 | 8/2003 | Colavito et al. | |
| 2003/0189947 A1 * | 10/2003 | Beshai | 370/428 |
| 2004/0057446 A1 | 3/2004 | Varsa et al. | |
| 2004/0218545 A1 * | 11/2004 | Pedersen | 370/252 |

FOREIGN PATENT DOCUMENTS

| | | |
|---|---|---|
| EP | 0 577 329 A2 | 1/1994 |
| WO | WO 01/37468 A2 | 5/2001 |

\* cited by examiner

*Primary Examiner* — Seema S Rao
*Assistant Examiner* — Wanda Z Russell
(74) *Attorney, Agent, or Firm* — Eschweiler & Associates, LLC

(57) ABSTRACT

In a buffer (10) to compensate for runtime fluctuations of data packets (1) transmitted over a transmission line (40), in order to be able to set optimally an additional retransmission delay by the buffer (10) it is proposed to calculate the probable hold time of a data packet (1) immediately after arrival of a data packet (1) in the buffer (10). The additional retransmission delay by the buffer (10) is set based on the probable hold time of the data packets (1) in the buffer (10). To guarantee optimum setting of the retransmission delay, both the maximum detected probable hold time and the minimum detected probable hold time of the data packets (1) are used. This is achieved preferably by means of a minimum value detector and a maximum value detector which detect extreme values of the probable hold time occurring at specific time intervals.

23 Claims, 3 Drawing Sheets

METHOD AND DEVICE FOR COMPENSATING FOR RUNTIME FLUCTUATIONS OF DATA PACKETS

Cross-reference is made to co-pending Ser. No. 11/203, 436 entitled "Method and Arrangement for Compensating for Jitter in the Delay of Data Packets", filed on even date herewith, and which is incorporated herein by reference.

FIELD OF THE INVENTION

The present invention concerns a method and a device for compensating for runtime fluctuations of data packets, in particular of data packets transmitted in a data network, which for example are used for the transmission of speech data.

BACKGROUND

In the transmission of speech data via packet-based data networks, the speech data are divided into individual data packets and transmitted over the data network. The runtime of the data packets can assume different values on transmission through the data network, i.e. the data packets are indeed emitted by a transmitter at regular time intervals but are not received by a receiver in the same regular time intervals. It is even possible that the data packets do not arrive in the same order in which they were emitted by the transmitter. Thus runtime fluctuations occur in the transmission of data packets through the data network. These runtime fluctuations are known as jitter. The greater the runtime fluctuations, i.e. the greater the jitter, the greater can also be the temporal interval between an ideal arrival time of a data packet at the receiver, i.e. the time of arrival of the data packet in a data network with a fixed runtime, and the actual arrival time.

To compensate for these runtime fluctuations usually a temporary memory is used in the form of a jitter buffer which provides an additional delay for the data packets to compensate for the runtime fluctuations of the data packets. If necessary the original order of the data packets is recreated.

The procedure in principle is to store received data packets temporarily in the buffer and retransmit the stored data packets from the buffer at regular intervals after an additional retransmission delay. The retransmission delay is intended to guarantee that the data packet to be retransmitted is as far as possible always available in the buffer.

The value of the additional retransmission delay for a data packet depends on whether the data packet has actually arrived. The greater the time interval between the arrival of the data packet in the buffer and the proposed retransmission time, the greater also the additional retransmission delay required for the data packet. The retransmission delay should correlate with the size of the runtime fluctuations of the data network, i.e. the greater the runtime fluctuations, the greater the retransmission delay must be set to avoid data packets having to be rejected because they arrive after their scheduled retransmission time. The scheduled retransmission time is defined in that a unit on which the data packets are retransmitted, for example a decoder to convert the data packets into speech data, after processing of a data packet expects the next data packet to be processed within a prespecified time interval. If this data packet is not available in the buffer, the missing data must for example be replaced by interpolation and the transmission quality of the speech data is reduced.

In the transmission of speech data via packet-based data networks, the sum of all delays in the data network considerably influences the quality of the speech data transmitted. This is particularly important for data network-based telephony applications, e.g. IP telephony. It has been shown here that the quality for counter-speech over the data network diminishes significantly if the sum of all delays in the data network exceeds 150 ms.

For this reason it is important to keep the retransmission delay through the buffer as short as possible to compensate for runtime fluctuations. It must firstly be guaranteed that the retransmission delay of the data packets is as small as possible, but again sufficiently large not to allow a disproportionate rise in the number of data packets arriving after their scheduled retransmission time and consequently having to be rejected.

The runtime fluctuations which typically occur in packet-based data networks normally have temporal variations in intensity. To avoid the retransmission delay through the buffer having to be matched to the poorest network conditions, i.e. the greatest runtime fluctuations for the data packets, the retransmission delay through the buffer can be adjusted adaptively i.e. adapted to the network conditions. This avoids the quality of the speech connection deteriorating unnecessarily due to a retransmission delay being selected too high for most cases. Buffers which can adapt their retransmission delay adaptively to the network conditions are also called adaptive jitter buffers.

For example WO 01/37468 A2 discloses a method for adapting the retransmission delay through a buffer, in which the occupation or fill level of the buffer is detected, i.e. the number of data packets stored therein. This takes place via a peak value detector, the value of which reflects the maximum occupation occurring in a specific time period. The read rate from the buffer and hence the occupation of the buffer are set as a function of the value of the peak value detector.

This procedure however offers only insufficient possibilities for keeping the retransmission delay to a minimum. If for example the data packets each comprise 10 ms speech data and the buffer is empty so that a data packet just arrived is transmitted again after just one millisecond, the actual hold time of the data packet in the buffer is just one millisecond. The occupation of the buffer in time units before arrival of the data packet is zero, immediately after arrival of the data packet 10 ms, and immediately after retransmission of the data packet again zero. The actual hold time of the data packet in the buffer, which is one millisecond, is thus only detected inadequately via the buffer occupation.

In order to achieve an effective minimizing of the additional retransmission delay through the buffer, as precise as possible a determination of the hold time is required. The mis-relationship between the hold time of the data packet in the buffer and the momentary occupation of the buffer becomes greater if the speech data for example are compressed using standardized speech compression G.723, as in this case even 30 ms of speech data are transmitted per data packet. For the example outlined above, the occupation of the buffer in time units would fluctuate between 0 and 30 ms, although the actual hold time of the data packet in the buffer is only one millisecond.

For data networks with very small delays (for example, AAL-based networks), the hold time of data packets in the intermediate memory can, as in the above example, be less than the length of the speech data in a data packet. Here the buffer occupation does not offer the necessary resolution to be able to set the retransmission delay through the buffer optimally. The retransmission delay through the buffer is therefore usually substantially greater than necessary. Furthermore problems occur on data networks in which it is not ensured that the data packets arrive in the same order as sent by the transmitter. In particular in this case it cannot be determined how many of the data packets arrive promptly before their scheduled retransmission time. It can for example occur that the buffer occupation, i.e. the number of data packets in the buffer, is large but the data packet to be transmitted next has not yet arrived in the buffer. If now the retransmission time of this data packet is reached, the missing data packet must be interpolated, which reduces the transmission quality.

U.S. Pat. No. 5,640,388 again discloses using not the buffer occupation but the hold time of the data packets in the buffer as a basis for setting the retransmission delay. The hold time of the data packets in the buffer is calculated from the difference between the arrival time in the buffer and the retransmission time from the buffer. This however means that the hold time can only be calculated when the data packet concerned has left the buffer again. In this case the analysis of the hold time of the data packet in the buffer is delayed by the actual hold time. The data packets in the buffer supply an amount for analysis of the hold time only when they have already been retransmitted. As a result, a reaction to changes in network conditions e.g. an increase in runtime fluctuations, can only be made after a delay. In such IP-based data networks the hold time of data packets is often 200 ms or more. This however means that a multiplicity of data packets is present in the buffer, the runtime fluctuations of which are not taken into account in setting the retransmission delay. It is therefore possible that because changing network conditions are taken into account too late, the buffer overflows or is fully emptied, i.e. an overrun or underrun of the buffer occurs.

SUMMARY

In view of the problems of the prior art described above, it is an object of the present invention to provide a method and a device which allows the retransmission delay through the buffer to be set to as low a value as possible, where at the same time the number of data packets arriving after their scheduled retransmission time is kept low.

This object is achieved by embodiments of the invention.

The present invention provides that runtime fluctuations of data packets are compensated in that data packets transmitted over a transmission line, e.g. a data network, are temporarily stored in a buffer and then the temporarily stored data packets retransmitted from the buffer at prespecified time intervals after an additional retransmission delay. In this way the runtime fluctuations of data packets are compensated, where different hold times in the buffer apply to the individual data packets. In particular, data packets with a short runtime as a mean runtime of the data packets have a longer hold time in the buffer and data packets with a longer runtime as the mean runtime of data packets have a shorter hold time in the buffer. This achieves the required compensation for runtime differences. The additional retransmission delay is intended to guarantee that a data packet to be retransmitted is available in the buffer before its scheduled retransmission time. It is provided that the additional retransmission delay of the data packets is set such that an adaptation to changing network conditions is guaranteed.

According to a first aspect of the present invention, it is provided that a minimum and a maximum extreme value are detected for a parameter which constitutes a measurement of the hold time of the data packets in the buffer. The retransmission delay of the data packets is then set depending on the detected minimum and maximum extreme values. This guarantees that both data packets with a maximum hold time in the buffer, i.e. data packets which reach the buffer very early before their scheduled retransmission time, and data packets with minimum hold time, i.e. data packets which reach the buffer shortly before their scheduled retransmission time, are taken into account in setting the retransmission delay of the data packets. In this way an optimum compromise can be achieved between minimising the additional retransmission delay through the buffer and minimising the number of packets which only arrive after their scheduled retransmission time.

The parameter which constitutes a measurement of the hold time of the data packets in the buffer can for example comprise the occupation of the buffer or the actual hold time of the data packets in the buffer. It is particular preferred however if the value which constitutes a measurement of the hold time of the data packets in the buffer is a probable hold time of the data packets in the buffer. The probable hold time of the data packets in the buffer is calculated before retransmission of the data packets from the buffer, preferably directly after arrival of the data packets in the buffer. In this way it is possible also to take into account in the setting of the retransmission delay data packets which have not yet been retransmitted. This guarantees a faster adaptation of the retransmission delay to changing network conditions.

According to a second aspect of the invention, it is provided that the additional retransmission delay is set dependent on the probable hold time in the buffer calculated for each data packet. The probable hold time is calculated for each data packet before the data packet is retransmitted, preferably directly after arrival of the data packet in the buffer. This guarantees, independently of the detection of extreme values provided according to the first aspect of the invention, a precise and reliable setting of the additional retransmission delay. According to the present invention however it is regarded as particularly advantageous to calculate the probable hold time of each data packet and set the retransmission delay of the data packets depending on the minimum and maximum extreme values established for the probable hold time of the data packets in the buffer.

According to the invention, the probable hold time of the data packets before retransmission of the data packet concerned can be calculated as the difference between a time marking of the data packet and a retransmission time which corresponds to a relative time progress relating to the time marking of the data packet momentarily retransmitted. The time marking of the data packets corresponds to a defined time before transmission of the data packet on the transmission line. In particular, the time marking can be formed by a time stamp which is determined by the transmitter, for example when the data packet is composed or transmitted. Thus e.g. in the case of an RTP protocol the time stamp is part of a data header. In the case of the AAL protocol, the time marking can be calculated on the basis of a UUI field and a sequence number interval. The necessary time marking is thus a direct component of the data packet or can be calculated from components of the data packet. The time marking usually corresponds here substantially to the time at which the data packet was generated by the transmitter, i.e. the time of transmission.

The probable hold time calculated in this way is designated the probable hold time as at the time of arrival of the data packet in the buffer possible adaptations to the retransmission delay made while the data packet is in the buffer are not yet known. If while the data packet is in the buffer, no adaptations to the retransmission delay are made, the probable hold time would correspond precisely to the actual hold time of the data packet in the buffer.

To detect the minimum and maximum extreme values of the parameter which reflects the hold time of the data packets in the buffer, preferably the maximum value of the parameter is detected with a maximum value detector and the minimum value of the parameter with a minimum value detector. The minimum value detector always assumes a new value when the detected parameter falls below the momentary value of the minimum value detector, and the maximum value detector always assumes a new value when the detected parameter exceeds the momentary value of the maximum value detector. The additional retransmission delay can then be set depending on the value of the minimum value detector and the value of the maximum value detector.

Preferably a mean threshold value is determined for this which is substantially proportional to an expected value of the runtime fluctuations of the data packets. In addition, a lower threshold value is determined which corresponds to a minimum hold time, that must not be passed, of the data packets in the buffer, and an upper threshold value which corresponds to a maximum hold time that must not be exceeded. The lower and upper threshold values can be derived from the mean threshold value, i.e. the expected value of the runtime fluctuations. The current value of the minimum value detector and maximum value detector is then compared with the lower, mean and upper threshold values to determine an adaptation value for the retransmission delay dependent on the result of the comparison. Then an adapted value for the retransmission delay can be determined by adding the momentary retransmission delay to the adaptation value. The use of these threshold values guarantees firstly that the retransmission delay can be adapted to the expected value of the runtime fluctuations and secondly that the minimum hold time of the data packets in the buffer is not undercut and the maximum hold time of the data packets in the buffer is not exceeded.

The minimum value detector and maximum value detector preferably have two time constants, where in the case that a new extreme value is detected, this is taken with a first time constant while, if no new extreme value is detected, the value of the minimum value detector or maximum value detector rises or falls with a second time constant. Preferably new extreme values are assumed immediately by the minimum value detector and maximum value detector. This guarantees that a temporary deterioration in network conditions, i.e. temporarily larger runtime fluctuations, do not cause the retransmission delay subsequently to be held permanently at too great a value. On the contrary, because of the rapid assumption of new extreme values a rapid response to changing network conditions is guaranteed.

The increase in value of the minimum value detector and decrease in value of the maximum value detector, if no new extreme values are detected, can take place at regular time intervals, however they are preferably implemented only when a new data packet has reached the buffer. This gives the advantage that if for example in a data network-based telephone application speech pauses occur so that no data packets or only few data packets arrive, the current value of the minimum value detector and the maximum value detector do not change or scarcely change. This is helpful as in this case the network conditions and in particular the runtime fluctuations of the data packets are difficult to observe and it is therefore advantageous to use the last extreme values found as a basis for setting the retransmission delay.

The invention also concerns a device to compensate for runtime fluctuations of data packets which comprises a memory medium designed as a buffer in order to store temporarily data packets received via a transmission line. The device is designed such that the temporarily stored data packets are retransmitted from the buffer at prespecified time intervals after an additional retransmission delay.

In accordance with the first aspect of the invention, the device is designed to detect a minimum and a maximum extreme value for a parameter which constitutes a measurement of the hold time of the data packets in the buffer, and to set the retransmission delay of the data packets depending on the minimum and maximum extreme values detected. Alternatively or in addition, according to the second aspect of the invention the device is designed, before the data packet is retransmitted, to calculate a probable hold time of each data packet in the buffer and to set the retransmission delay depending on the calculated probable hold time of the data packet in the buffer. Preferably the device is designed to implement the method according to the invention described above.

The present invention further concerns a computer program product which comprises a program code or electronically legible control information designed to execute the method according to the invention when used in a computer system. The present invention is not however restricted to use in conventional computer systems but can also be used in specific devices designed for transmission of speech data or video data via packet-based data networks, e.g. internet telephony or similar.

The present invention allows firstly the hold time of the data packets in the buffer to be set before retransmission of the data packets from the buffer. In this way it is possible to react quickly to changes in network conditions. Secondly with the invention both the hold time of data packets arriving in the buffer shortly before their scheduled retransmission time and the hold time of data packets arriving in the buffer very early before their scheduled retransmission time can be taken into account in setting the additional retransmission delay. This guarantees at the same time as short a retransmission delay as possible and as low as possible the number of packets which arrive after their scheduled retransmission time and hence are unable to be retransmitted.

The invention is now described below in more detail with reference to a preferred embodiment example and the enclosed drawings.

DETAILED DESCRIPTION

Figure 1:
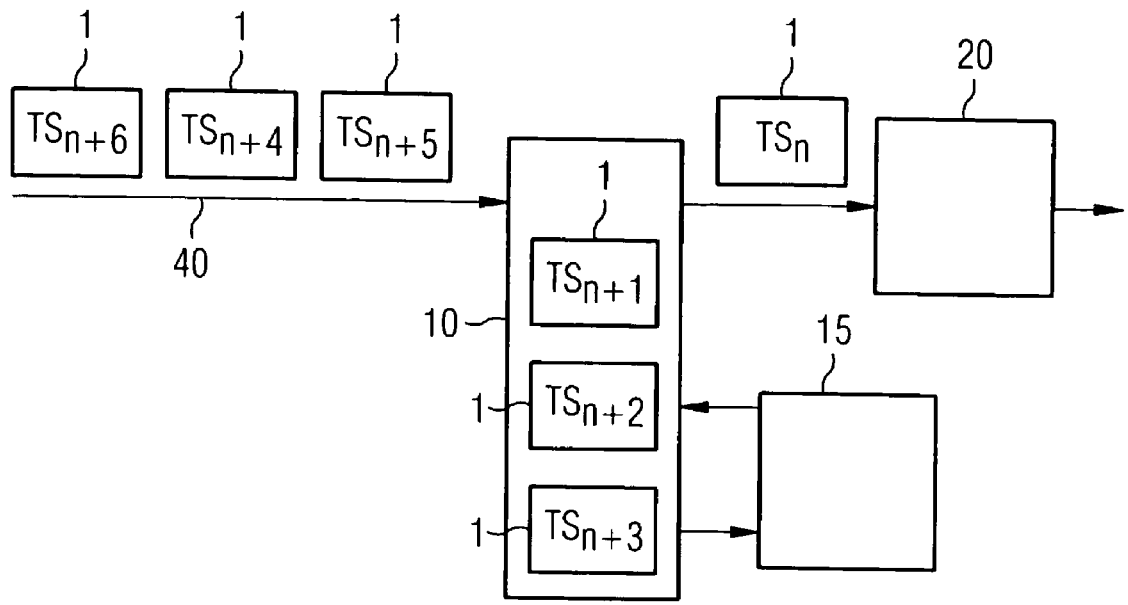
FIG. 1 shows an arrangement to compensate for runtime fluctuations of data packets according to an embodiment example of the invention.

FIG. 1 shows diagrammatically an example for an arrangement to compensate for runtime fluctuations of data packets 1, which is based on a buffer 10 designed as a jitter buffer. The data packets 1 are received via a transmission line 40 formed by a data network or part of a data network, and temporarily stored in the buffer 10. The data packets 1 are marked $TS_{n+x}$ where the time marking corresponds to the time of generation or transmission of the data packets 1 by a transmitter (not shown). The data packets 1 are temporarily stored in the buffer 10 and then retransmitted at prespecified time intervals from the buffer 10 so as to compensate for the runtime fluctuations affecting the data packets 1 reaching the buffer 10. For this the buffer 10 applies an additional retransmission delay ΔT which is intended to guarantee that the buffer 10 does not become empty, i.e. that the data packet 1 to be retransmitted momentarily is always available in the buffer 10. The time marking of the momentarily retransmitted data packet 1 is called $TS_n$ and the subsequent time markings have a correspondingly higher index according to x=1, 2, 3 etc.

The time markings $TS_{n+x}$ for each data packet 1 show the time of its transmission or generation. The data packets 1 encode speech data which are transmitted by the transmitter as a continuous data stream, so that each of the data packets 1 contains a prespecified length of speech data and the entire data stream of speech data results from the joining of the contents of the individual data packets 1. The length of the speech data encoded in the data packets 1 can for example be 10 ms or 30 ms. The time markings $TS_{n+x}$ and $TS_{n+x+1}$ of two successive data packets 1 thus differ by the length of the speech data encoded in the data packets 1.

Although the present example is discussed below with reference to speech data transmitted, the data packets can also be used to transmit other data e.g. video data.

The time markings $TS_{n+x}$ of the data packets 1 can, depending on the transmission protocol used, either be a direct part of the data packets 1 or arise from components of the data packets 1. For example, in the case of the RTP protocol, a so-called time stamp can be contained in a header of the data packets 1. In the case of the AAL protocol, the time marking $TS_{n+x}$ can be calculated based on the UUI field and the sequence number interval.

The data packets 1 are retransmitted from the buffer 10 to a decoder 20 which decodes the speech data contained in the data packets 1 and re-assembles the speech data into a continuous data stream. For this it is necessary for the decoder 20 to receive the data packets 1 at precise prespecified minimum time intervals. This avoids missing speech data having to be supplemented by interpolation with loss of quality. The prespecified time intervals in which the decoder 20 expects the data packets 1 are in principle dependent on the length of the speech data encoded in the data packets 1.

To avoid the data packets 1 not being available in the buffer 10 at their scheduled retransmission time. i.e. when the decoder 20 expects the data packet 1 concerned, the buffer 10 provides the additional retransmission delay ΔT to guarantee that as many data packets 1 as possible reach the buffer 10 before their scheduled retransmission time. As the arrival times of the data packets 1 at the buffer 10 are dependent on the network conditions, i.e. the runtime of the data packets concerned through the data network, the retransmission delay ΔT is set by means of a control block 15 and adapted to the changing network conditions.

The retransmission delay ΔT is set on the basis of a probable hold time $t_{n+x}$ of the data packets 1 in the buffer 10. The index n+x represents the sequential numbering of the data packets 1 already explained in connection with the time markings $TS_{n+x}$. The probable hold time $t_{n+x}$ of the data packets 1 in the buffer 10 is calculated directly before arrival of the data packets 1 in the buffer 10. This means that the probable hold time $t_{n+x}$ of the data packets 1 is available even before the retransmission time of the data packets 1 from the buffer 10, in order to set the retransmission delay ΔT based thereon. This guarantees a faster adaptation to the changing network conditions.

The probable hold time $t_{n+x}$ of a data packet is calculated on the basis of the time marking $TS_{n+x}$ of the data packet. In addition a further parameter is used which corresponds to the relative time progress on retransmission of data packets 1 from the buffer 10. For this a retransmission time T0 is defined which is set to the time marking $TS_n$ of the momentarily retransmitted data packet 1 plus the length L in time units of the speech data encoded in the data packets 1. The retransmission time T0 corresponds then to the time marking $TS_{n+1}$ of the data packet 1 which must be retransmitted next. It is irrelevant whether this data packet 1 to be retransmitted next is already in the buffer 10 or not.

When a new data packet 1 with time marking $TS_{n+x}$ reaches the buffer 10, the difference between the time marking $TS_{n+x}$ and the retransmission time T0 serves as a basis for calculation of the probable hold time $t_{n+x}$ of the data packet 1 in the buffer 10. Also taken into account is the time gap between arrival of the data packet 1 in the buffer 10 and the scheduled retransmission time for the next data packet 1 to be retransmitted from the buffer 10, so that the probable hold time $t_{n+x}$ of data packet 1 in the buffer 10 can be calculated with an accuracy greater than the temporal length L of the speech data in the data packets 10. In the present case this is achieved in that the retransmission time T0 is adapted time-dependent by a further parameter NR. When the data packet 1 to be momentarily retransmitted is released for retransmission, i.e. at the start of the retransmission process, the further parameter NR is set to the temporal length L of the data packets 1, e.g. 10 ms. Then the further parameter NR is decremented over time so that it always corresponds to the time difference until the scheduled retransmission time of the data packet 1 to be retransmitted next. If thus the further parameter NR is subtracted from the retransmission time defined above, a value results which precisely reflects the relative time progress on retransmission of the data packets 1.

The retransmission time T0 in this case arises as the difference of the time marking $TS_n$ of the momentarily retransmitted data packet 1 plus the temporal length L of the data packets 1 and the further parameter NR:

$$T0 = TS_n + L - NR.$$

Consequently for a data packet 1 with the time marking $TS_{n+x}$, on arrival of the data packet 1 in the buffer 10, its probable hold time $t_{n+x}$ in the buffer 10 can be calculated according to:

$$T_{n+x} = TS_{n+x} - T0.$$

The calculation of the probable hold time $t_{n+x}$ can however be structured differently in detail. For example, the retransmission time T0 can also be set to the time marking of the momentarily retransmitted data packet $TS_n$ without adding the length of the data packets 1. In this case the retransmission time T0 could be incremented over time so that the retransmission time T0 always precisely reflects the relative time progress on retransmission of the data packets 1.

If the probable hold time $t_{n+x}$ is not calculated directly after arrival of the data packet 1 concerned in the buffer, in addition the temporal difference between the calculation time and the arrival time must be taken into account.

In order to make optimum use of the probable hold time $t_{n+x}$ calculated in this way of the data packets 1 in the buffer 10 for setting the additional retransmission delay ΔT by the buffer 10, extreme values of the calculated probable hold time $t_{n+x}$ are detected. This means that both the shortest probable hold time $t_{n+x}$ occurring and the longest probable hold time $t_{n+x}$ occurring in a particular period are used to set the additional retransmission delay ΔT. This is achieved by use of a minimum value detector $PD_{MIN}$ for the minimum extreme value of the probable hold time $t_{n+x}$ and a maximum value detector $PD_{MAX}$ for the maximum extreme value of the probable hold time $t_{n+x}$. The values of the minimum value detector $PD_{MIN}$ and the maximum value detector $PD_{MAX}$ are referred to below also as $PD_{MIN}$ and $PD_{MAX}$.

The minimum value detector $PD_{MIN}$ and the maximum value detector $PD_{MAX}$ are designed such that, on a new extreme value of the probable hold time $t_{n+x}$ i.e. on a probable hold time $t_{n+x}$ which is less than the momentary value of the minimum value detector $PD_{MIN}$ or greater than the momentary value of the maximum value detector $PD_{MAX}$, they rapidly adapt their value to the respective new extreme value. Preferably a new extreme value is assumed immediately by the minimum value detector $PD_{MIN}$ and the maximum value detector $PD_{MAX}$.

In the case where no new extreme value is detected, the current value of the minimum value detector $PD_{MIN}$ and the maximum value detector $PD_{MAX}$ is increased or reduced respectively over time. This achieves that the minimum value detector $PD_{MIN}$ and the maximum value detector $PD_{MAX}$ do not represent the absolute extreme values of the probable hold time $t_{n+x}$ but represent relative extreme values which have occurred within a particular period.

The value of the minimum value detector $PD_{MIN}$ is increased and the value of the maximum value detector $PD_{MAX}$ reduced such that the adaptation of the value concerned is slower than the assumption of a new extreme value. In particular, this tracking of the respective values of the minimum value detector $PD_{MIN}$ and the maximum value detector $PD_{MAX}$ is performed only when new values are available for the probable hold time $t_{n+x}$ i.e. when a new data packet 1 has reached the buffer 10. This achieves that the minimum value detector $PD_{MIN}$ and the maximum value detector $PD_{MAX}$ retain their values when the changing network conditions are difficult to observe because of the low number or absence of data packets 1 reaching the buffer 10.

Figure 2:
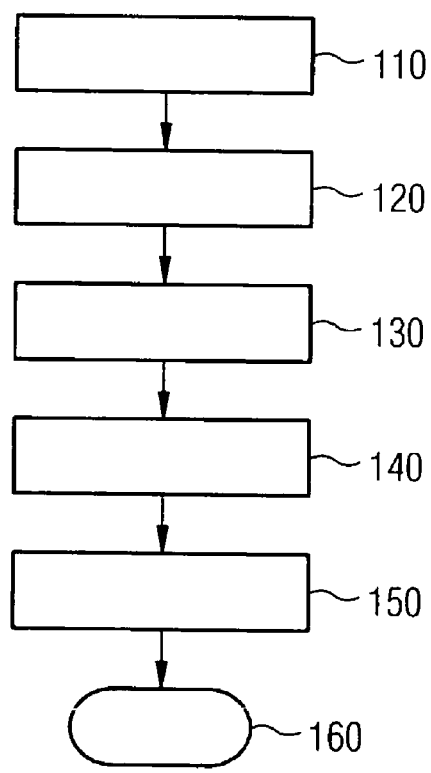
FIG. 2 shows a flow diagram to clarify a method for setting the retransmission delay of data packets according to the embodiment example of the invention.

FIG. 2 shows a flow diagram illustrating the process for setting or adjusting the retransmission delay $\Delta T$ of the data packets 1 from the buffer 10. When a new data packet 1 with the time marking $TS_{n+x}$ has reached the buffer 10, the method shown determines an adjustment value $\Delta$ for the retransmission delay $\Delta T$ which guarantees that the retransmission delay $\Delta T$ is equal to an optimum value. The adaptation value $\Delta$ is determined in time units, where a positive value means an increase in the retransmission delay $\Delta T$ and a negative value means a reduction in the retransmission delay $\Delta T$.

The actual process of adaptation of the retransmission delay $\Delta T$ can be achieved in various ways. If the retransmission delay $\Delta T$ is extended, in principle it must be ensured that the data packets are output more slowly, and on a reduction in the retransmission delay $\Delta T$, in principle it must be ensured that the speech data are output more quickly. This can for example be achieved if the time intervals in which the data packets 1 are retransmitted from the buffer, are adapted accordingly.

When a new data packet 1 has reached the buffer 10, in the calculation step 110 first the probable hold time $t_{n+x}$ is calculated in the buffer 10. This is done in the method shown above on the basis of the time markings $TS_{n+x}$ of the data packets 1.

The calculated probable hold time $t_{n+x}$ is then detected in extreme value detection step 120 by means of the minimum value detector $PD_{MIN}$ and the maximum value detector $PD_{MAX}$. If the calculated value of the probable hold time $t_{n+x}$ falls below the momentary value of the minimum value detector $PD_{MIN}$, the calculated value of the probable hold time $t_{n+x}$ is assumed as a new value of the minimum value detector $PD_{MIN}$. If this is not the case, the value of the minimum value detector $PD_{MIN}$ is increased by a prespecified amount. If the calculated value of the probable hold time $t_{n+x}$ exceeds the momentary value of the maximum value detector $PD_{MAX}$, the calculated value of the probable hold time $t_{n+x}$ is assumed as a new value of the maximum value detector $PD_{MAX}$. If this is not the case, the value of the maximum value detector $PD_{MAX}$ is reduced by a prespecified amount. The amounts by which the value of the minimum value detector $PD_{MIN}$ is increased or the value of the maximum value detector $PD_{MAX}$ reduced if no new extreme values are detected, are then preferably adapted to the network conditions to be expected.

In the adaptation value determination step 130, depending on the values of the minimum value detector $PD_{MIN}$ and the maximum value detector $PD_{MAX}$, the adaptation value $\Delta$ for adapting the retransmission delay $\Delta T$ is determined. This takes place by comparison of the values of the minimum value detector $PD_{MIN}$ and the maximum value detector $PD_{MAX}$ with prespecified threshold values.

Then in correction step 140, the current value of the minimum value detector $PD_{MIN}$ and the maximum value detector $PD_{MAX}$ is corrected by the adaptation value $\Delta$, i.e. the adaptation value $\Delta$ is added to the current value of the minimum value detector $PD_{MIN}$ and the maximum value detector $PD_{MAX}$. This avoids the same adaptation process being repeated several times. This is of particular advantage as the input parameter used to calculate the adaptation value $\Delta$ is the probable hold time $t_{n+x}$ of the data packets in the buffer 10. An adaptation of the retransmission delay $\Delta T$ thus also means that the probable hold time $t_{n+x}$ of the data packets 1 in the buffer 10 changes. This is taken into account by the correction of the current value of the minimum value detector $PD_{MIN}$ and the maximum value detector $PD_{MAX}$.

In adaptation step 150 finally the retransmission delay is adapted in that the adaptation value $\Delta$ determined is added to the momentary retransmission delay $\Delta T$.

The method ends at end point 160 and is repeated when a new data packet 1 reaches the buffer 10.

Figure 3:
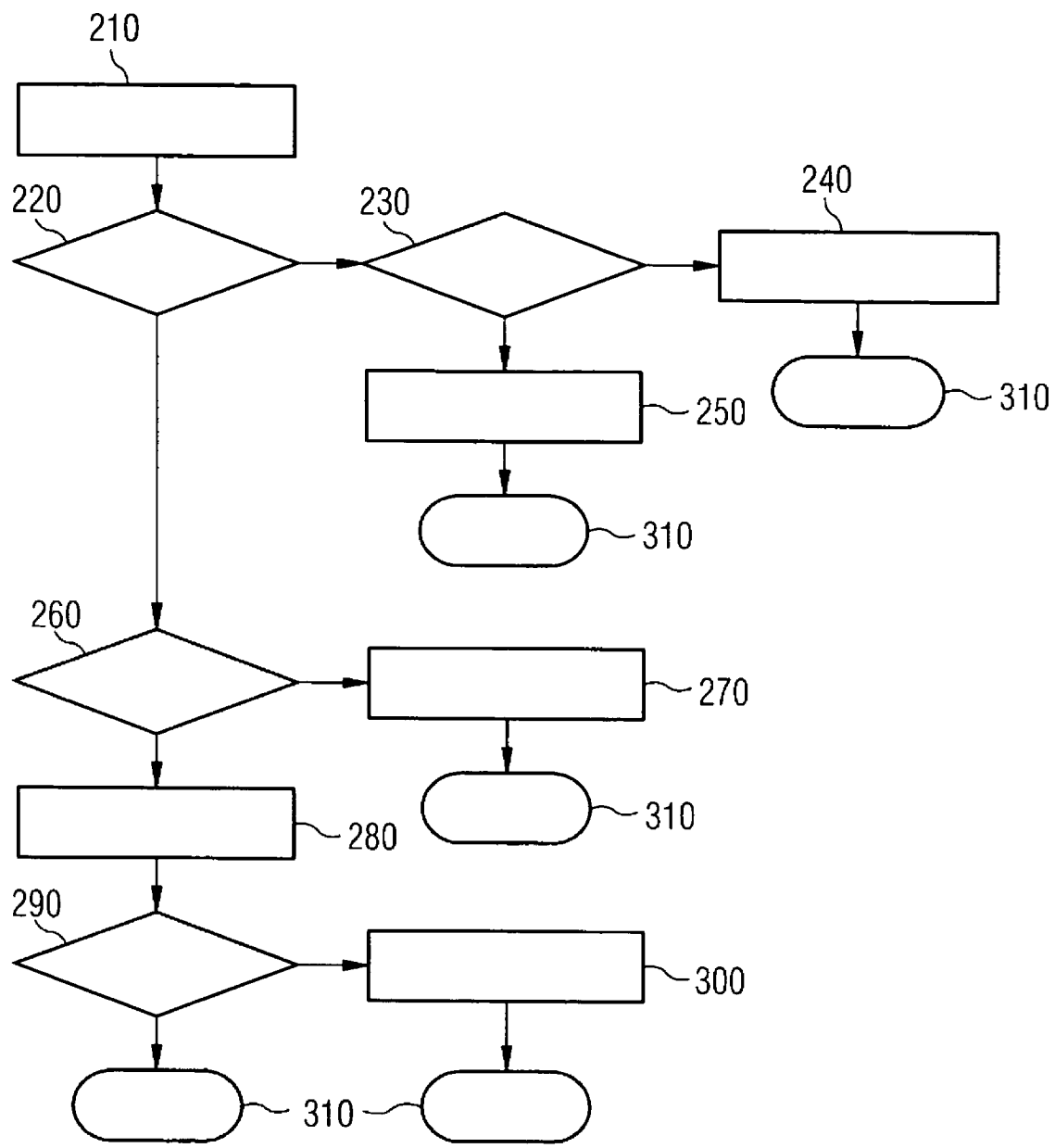
FIG. 3 shows a flow diagram to clarify the determination of an adaptation value for adapting the retransmission delay according to the embodiment example of the invention.

FIG. 3 shows a flow diagram which shows the determination of the adaptation value $\Delta$ depending on the value of the minimum value detector $PD_{MIN}$ and the maximum value detector $PD_{MAX}$. For this a comparison is made of the current value of the minimum value detector $PD_{MIN}$ and the maximum value detector $PD_{MAX}$ with threshold values comprising a lower threshold value LO, a mean threshold value OPT and an upper threshold value HI. The mean threshold value OPT is selected such that it is proportional to an expected value of the runtime fluctuations in the data network. The mean threshold value OPT represents an optimum hold time for the data packets 1 which are transmitted most quickly through the data network. The lower threshold value LO can be derived form the mean threshold value OPT or fixed. The lower threshold value LO corresponds to a minimum hold time of the data packets 1 in the buffer 10 which must not be undercut. This provides an extra security as the mean threshold value derived from the expected value for runtime fluctuations can differ from the actual runtime fluctuations occurring. It is however also possible to set the lower threshold value LO to zero. The upper threshold value HI can be derived from the mean threshold value OPT or fixed. The upper threshold value HI corresponds to a maximum hold time of the data packets 1 in the buffer 10 which must not be exceeded.

To determine the adaptation value $\Delta$ first in initialisation step 210 the adaptation value $\Delta$ is set to zero. Then in comparison step 220, it is checked whether the value of the maximum value detector $PD_{MAX}$ is less than the mean threshold value OPT. If this is the case, we proceed with comparison step 230. If this is not the case, we proceed with comparison step 260.

In comparison step 230, it is checked whether the value of the minimum value detector $PD_{MIN}$ is greater than or equal to the lower threshold value LO. If this is the case, we proceed with adaptation value calculation step 240. If this is not the case, we proceed with adaptation value calculation step 250.

In adaptation value calculation step 240, the adaptation value $\Delta$ is set to the mean value of the difference between the value of the minimum value detector $PD_{MIN}$ and the lower threshold value LO, and the difference between the mean threshold value OPT and the value of the maximum value detector $PD_{MAX}$. This means that the adaptation value is determined by $$\Delta=(OPT+LO-PD_{MAX}-PD_{MIN})/2.$$

This achieves that, after correcting the values of the minimum value detector $PD_{MIN}$ and the maximum value detector $PD_{MAX}$ with the adaptation value $\Delta$ in correction step 140, the distance between the lower threshold value LO and the minimum value detector $PD_{MIN}$ is equal to the distance between the mean threshold value OPT and the maximum value detector $PD_{MAX}$. This defines the adaptation value $\Delta$ for the first case in which the value of the minimum value detector $PD_{MIN}$ lies above the lower threshold value LO and the value of the maximum value detector $PD_{MAX}$ lies below the mean threshold value OPT ($PD_{MIN} \geq LO$, $PD_{MAX} < OPT$).

In calculation step 250 the adaptation value $\Delta$ is set to the always smaller difference between the lower threshold value LO and the value of the minimum value detector $PD_{MIN}$ or between the mean threshold value OPT and the value of the maximum value detector $PD_{MAX}$. The adaptation value $\Delta$ is thus determined by $$\Delta=\min(LO-PD_{MIN}, OPT-PD_{MAX}).$$

This defines the adaptation value $\Delta$ for a second case in which the value of the minimum value detector $PD_{MIN}$ lies below the lower threshold value LO and the value of the maximum value detector $PD_{MAX}$ lies below the mean threshold value OPT ($PD_{MIN} < LO$, $PD_{MAX} < OPT$).

In comparison step 260 it is checked whether the value of the minimum value detector $PD_{MIN}$ is greater than or equal to the lower threshold value LO. If this is the case, we proceed with adaptation value calculation step 270. If this is not the case, we proceed with adaptation value calculation step 280.

In adaptation value calculation step 270 the adaptation value $\Delta$ is set to the negative, always smaller difference between the lower threshold value LO and the value of the minimum value detector $PD_{MIN}$ or between the value of the maximum value detector $PD_{MAX}$ and the mean threshold value OPT. The adaptation value $\Delta$ is thus determined by $$\Delta=\min(PD_{MIN}-LO, PD_{MAX}-OPT).$$

This defines the adaptation value $\Delta$ for a third case in which the value of the minimum value detector $PD_{MIN}$ lies above the lower threshold value LO and the value of the maximum value detector $PD_{MAX}$ lies above the mean threshold value OPT ($PD_{MIN} \geq LO$, $PD_{MAX} \geq OPT$).

In adaptation value calculation step 280 the adaptation value $\Delta$ is set to the always smaller difference between the lower threshold value LO and the value of the minimum value detector $PD_{MIN}$ or between the upper threshold value HI and the value of the maximum value detector $PD_{MAX}$. The adaptation value $\Delta$ is thus determined by $$\Delta=\min(LO-PD_{MIN}, HI-PD_{MAX}).$$

This defines the adaptation value $\Delta$ for a fourth case in which the value of the minimum value detector $PD_{MIN}$ lies below the lower threshold value LO and the value of the maximum value detector $PD_{MAX}$ lies above the mean threshold value OPT ($PD_{MIN} < LO$, $PD_{MAX} \geq OPT$).

In the fourth case it is also ensured that the adaptation value $\Delta$ is not less than zero in order thus to prevent underrunning of the buffer 10 through a low retransmission delay $\Delta T$. For this in comparison step 290 it is checked whether the adaptation value $\Delta$ calculated in adaptation value calculation step 280 is less than zero. If this is the case, we proceed with adaptation value calculation step 300. If this is not the case, the adaptation value $\Delta$ is retained and the method ends at end point 310.

In adaptation value calculation step 300, the adaptation value $\Delta$ is set to zero. The adaptation value is thus determined by $$\Delta=0.$$

This defines the adaptation value $\Delta$ for the special case of the fourth case if in adaptation value calculation step 280 an adaptation value $\Delta$ is calculated which is less than zero.

After the adaptation value calculation steps 240, 250, 270 and 300, the method ends at end point 310 and we proceed with the steps explained with reference to FIG. 2.

Figure 4:
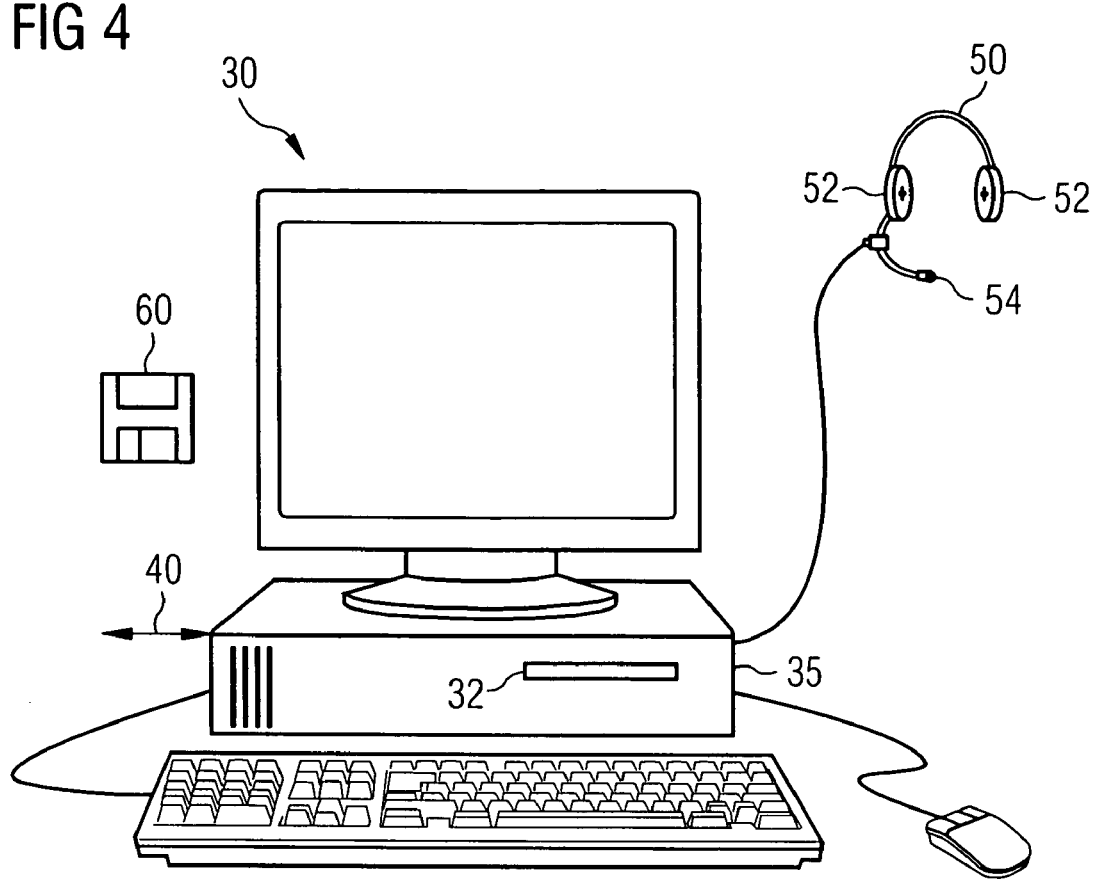
FIG. 4 shows a computer system which can be used in a data network-based telephony application and which is designed to compensate for runtime fluctuations according to the embodiment example in FIGS. 1-3.

FIG. 4 shows a computer system 30 which can be used in a data network-based telephony application. It can for example be a telephony application via an IP-based data network. The computer system 30 has data processing means 35 which contain memory means that are used as the buffer 10 in the compensation for runtime fluctuations of data packets received. The computer system 30 has an interface via which it is connected with the transmission line 40, i.e. the data network. The computer system 30 executes a program code which causes the compensation for runtime fluctuations of data packets received via the data network to be performed in accordance with the method previously described with reference to FIGS. 1 to 3. The program code can be supplied to the computer system for example via a data carrier 60 which can be read in a corresponding read device 32. The data packets 1 received by the computer system 30 are converted into speech data by the decoder 20 which can also be implemented by corresponding software, and then output via an input/output means 50 for speech data. For this the input/output means 50 for the speech data comprise output means in the form of speakers 52. Furthermore input means are provided in the form of a microphone 54 via which speech data can be input. The computer system 30 is thus designed so that also speech data can be input into the computer system 30 and output to the transmitter or to another receiver via the transmission line 40 in the form of data packets. The computer system 30 is thus designed in particular so that a bidirectional transmission of speech data is possible.

The arrangement described with reference to FIG. 1 in connection with the method described above to compensate for runtime fluctuations can however also be used in other devices, e.g. in an IP telephone designed for data network-based telephony applications.

The invention claimed is:

1. A method for compensating for runtime fluctuations of data packets, comprising the steps:
   temporarily storing data packets transmitted over a data transmission line in a memory,
   retransmitting the temporarily stored data packets from the memory at prespecified time intervals after an additional retransmission delay,
   detecting a magnitude of a minimum extreme value and a magnitude of a maximum extreme value for a parameter which constitutes a measurement of a hold time of the data packets in the memory, and setting the additional retransmission delay of the data packets depending on the detected magnitude of the minimum extreme value and depending on the detected magnitude of the maximum extreme value.

2. The method according to claim 1, wherein the parameter which constitutes the measurement of the hold time of the data packets in the memory corresponds to a fullness of the memory.

3. The method according to claim 1, wherein the parameter which constitutes the measurement of the hold time of the data packets in the memory comprises an actual hold time of the data packets in the memory.

4. The method according to claim 1, wherein the parameter which constitutes the measurement of the hold time of the data packets in the memory comprises a probable hold time of the data packets in the memory.

5. The method according to claim 4, further comprising the step:

calculating the probable hold time of a first data packet using a difference between a time marking of the first data packet and a time marking of a previously received data packet being retransmitted from the memory, where the time marking of the first data packets and the previously received data packet corresponds in each case to a defined time before retransmission of the data packet on the transmission line.

6. The method according to claim 5, further comprising the step:

determining the probable hold time depending on the time marking of the previously received data packet and a further parameter which corresponds to a time interval between the arrival of the first data packet in the memory and the start of retransmission of the previously received data packet.

7. The method according to claim 1, further comprising the steps:

obtaining a minimum limit value for the parameter and a maximum limit value of the parameter, replacing the minimum limit value when the parameter falls below a current value of the minimum limit value, and replacing the maximum limit value when the parameter exceeds a current value of the maximum limit value, and setting the retransmission delay depending on the minimum limit value and the maximum limit value.

8. The method according to claim 7, further comprising the steps:

obtaining a mean threshold value which is proportional to an expected value of the runtime fluctuations of the data packets, obtaining a lower threshold value which corresponds to a minimum hold time of the data packets in the memory that must not be passed, obtaining an upper threshold value which corresponds to a maximum hold time that must not be exceeded, comparing the minimum limit value and the maximum limit value with the lower, mean and upper threshold values, and adapting the retransmission delay by an adaptation value which is dependent on the result of the comparison.

9. The method according to claim 8, further comprising the step:

correcting the minimum limit value and the maximum limit value by the adaptation value.

10. The method according to claim 8, further comprising the step:

setting the adaptation value to a mean of the difference between the minimum limit value and the lower threshold value and the difference between the mean threshold value and the maximum limit value if the minimum limit value lies above the lower threshold value and the maximum value lies below the mean threshold value, setting the adaptation value to another value otherwise.

11. The method according to claim 10, further comprising the step:

setting the adaptation value to zero if the minimum limit value lies below the lower threshold value and the maximum limit value lies above the mean threshold value, and if a smaller of a difference of between the lower threshold value and the minimum limit value and a difference between the upper threshold value and the maximum limit value is less than zero.

12. The method according to claim 7, further comprising:

changing the minimum limit value pursuant to a first time constant if the parameter falls below the current value of the minimum limit value, and changing the minimum limit value pursuant to a second time constant that is greater than the first time constant if the parameter does not fall below the current value of the minimum limit value.

13. The method according to claim 7, further comprising:

changing the maximum limit value pursuant to a first time constant if the parameter exceeds the current value of the maximum limit value, and changing the maximum value such that the maximum limit value falls with a second time constant that is greater than the first time constant if the parameter does not exceed the current value of the maximum limit value.

14. The method according to claim 12, further comprising the step:

immediately assuming a new minimum limit value if the parameter falls below the current value of the minimum limit value.

15. The method according to claim 7, further comprising the step:

adopting a new minimum limit value and/or a new maximum limit value at regular time intervals.

16. The method according to claim 7, further comprising the step:

adopting a new minimum limit value and/or a new maximum limit value only if a new data packet has been received.

17. The method according to claim 1, wherein the transmission line is part of a data network and the data packets contain speech data transmitted over the data network.

18. A method for compensating for runtime fluctuations of data packets, comprising the steps:

temporarily storing data packets received over a data transmission line in a memory, retransmitting the temporarily stored data packets from the memory at pre-specified time intervals after an additional retransmission delay, calculating a probable hold time of each data packet in the memory before the data packet is retransmitted, and setting the additional retransmission delay depending on the calculated probable hold time of the data packet in the memory, wherein calculating the probable hold time includes using a difference between a time marking of the data packet and a time marking of a previously received data packet, which is being retransmitted from the memory, the time marking of the data packet and the previously received data packet in each case corresponding to a defined time before transmission of the data packet on the transmission line.

19. The method according to claim 18, further comprising the step:
calculating the probable hold time of the data packet based on a difference between a time marking of the data packet and a retransmission time which corresponds to a relative time progress relating to a time marking of a previously received data packet that is to be currently retransmitted, where the time marking of the data packet corresponds in each case to a defined time before transmission of the data packet on the transmission line.

20. The method according to claim 19, further comprising the step:
determining the retransmission time depending in part on a further parameter which corresponds to a time interval between the arrival of the data packet in the memory and the start of retransmission of the previously received data packet.

21. The method according to claim 19, wherein the transmission line is part of a data network and the data packets contain speech data transmitted over the data network.

22. A non-transitory computer readable medium containing a program code that enables a computer system to perform a method of compensating for runtime fluctuations of data packets, comprising the steps:
temporarily storing data packets transmitted over a data transmission line in a memory,
retransmitting the temporarily stored data packets from the memory at prespecified time intervals after an additional retransmission delay,
detecting a magnitude of a minimum extreme value and a magnitude of a maximum extreme value for a parameter which constitutes a measurement of a hold time of the data packets in the memory, and
setting the additional retransmission delay of the data packets depending on the detected magnitude of the minimum extreme value and depending on the magnitude of the detected maximum extreme value.

23. A non-transitory computer readable medium containing a program code that enables a computer system to perform a method of compensating for runtime fluctuations of data packets, comprising the steps:
temporarily storing data packets received over a data transmission line in a memory,
retransmitting the temporarily stored data packets from the memory at prespecified time intervals after an additional retransmission delay,
calculating a probable hold time of each data packet in the memory before the data packet is retransmitted, and
setting the additional retransmission delay depending on the calculated probable hold time of the data packet in the memory,
wherein calculating the probable hold time includes using a difference between a time marking of the data packet and a time marking of a previously received data packet, which is being retransmitted from the memory, the time marking of the data packet and the previously received data packet in each case corresponding to a defined time before transmission of the data packet on the transmission line.

* * * * *